(12) United States Patent
Mattson

(10) Patent No.: US 9,130,883 B2
(45) Date of Patent: Sep. 8, 2015

(54) METHOD AND APPARATUS TO INCREASE FORWARDING SILICON FUNCTIONALITY THROUGH PACKET MANIPULATION

(71) Applicant: Futurewei Technologies, Inc., Plano, TX (US)

(72) Inventor: Geoffrey Andrew Mattson, San Francisco, CA (US)

(73) Assignee: Futurewei Technologies, Inc., Plano, TX (US)

( * ) Notice: Subject to any disclaimer, the term of this patent is extended or adjusted under 35 U.S.C. 154(b) by 21 days.

(21) Appl. No.: 13/625,771

(22) Filed: Sep. 24, 2012

(65) Prior Publication Data

US 2013/0170493 A1    Jul. 4, 2013

Related U.S. Application Data

(60) Provisional application No. 61/538,584, filed on Sep. 23, 2011.

(51) Int. Cl.
| | |
|---|---|
| *H04L 12/54* | (2013.01) |
| *H04L 12/741* | (2013.01) |
| *H04L 29/06* | (2006.01) |
| *H04L 12/721* | (2013.01) |
| *H04L 29/12* | (2006.01) |

(52) U.S. Cl.
CPC .............. *H04L 45/74* (2013.01); *H04L 45/66* (2013.01); *H04L 69/12* (2013.01); *H04L 69/22* (2013.01); *H04L 61/103* (2013.01); *H04L 61/6059* (2013.01)

(58) Field of Classification Search
CPC ....... H04L 45/00; H04L 45/471; H04L 45/74; H04L 45/66; H04L 69/22; H04L 69/12; H04L 61/103; H04L 61/6059

USPC ................ 370/352–356, 389–390, 392–394, 370/400–401, 428–429, 432, 465–466, 474, 370/476

See application file for complete search history.

(56) References Cited

U.S. PATENT DOCUMENTS

| | | | |
|---|---|---|---|
| 6,791,947 B2* | 9/2004 | Oskouy et al. ................. | 370/238 |
| 6,944,168 B2* | 9/2005 | Paatela et al. ................. | 370/401 |
| 7,411,957 B2* | 8/2008 | Stacy et al. .................... | 370/392 |
| 7,643,486 B2* | 1/2010 | Belz et al. ...................... | 370/392 |

(Continued)

OTHER PUBLICATIONS

International Search Report dated Dec. 20, 2012 in connection with International Patent Application No. PCT/US2012/54506.

(Continued)

*Primary Examiner* — Kevin Mew
(74) *Attorney, Agent, or Firm* — Robert D. McCutcheon

(57) ABSTRACT

A packet preprocessing device is used in conjunction with a non-programmable packet forwarding processor (NLFP) to apply a different system function to received data packets than the function normally applied by the NLFP on the packets. Received data packets are pre-processed (e.g., modifying, manipulating, altering, spoofing, etc.) in order to enable, or cause, NLFPs that process the data packets to provide, in effect, a system-level behavior on the packets that is different from the system-level behavior for which the NLFP is/was conventionally designed. The data packet is "pre-processed" to change or manipulate the data packet, and then the NLFP processes the pre-processed data packet in accordance with its conventional function(s) which alters the overall function applied to the data packet.

20 Claims, 2 Drawing Sheets

(56) References Cited

U.S. PATENT DOCUMENTS

| | | | |
|---|---|---|---|
| 8,411,677 B1* | 4/2013 | Colloff | 370/389 |
| 8,665,875 B2* | 3/2014 | Epps et al. | 370/392 |
| 2002/0163935 A1* | 11/2002 | Paatela et al. | 370/466 |
| 2005/0165756 A1 | 7/2005 | Fehse | |
| 2006/0029104 A1* | 2/2006 | Jungck | 370/498 |
| 2008/0049774 A1 | 2/2008 | Swenson et al. | |
| 2008/0117913 A1* | 5/2008 | Tatar et al. | 370/392 |
| 2008/0279188 A1 | 11/2008 | Alfieri et al. | |
| 2009/0213856 A1* | 8/2009 | Paatela et al. | 370/392 |
| 2010/0011434 A1* | 1/2010 | Kay | 726/14 |
| 2010/0111109 A1* | 5/2010 | Herzog et al. | 370/474 |
| 2010/0162089 A1* | 6/2010 | Yeh et al. | 714/807 |
| 2011/0013648 A1* | 1/2011 | Choi et al. | 370/474 |
| 2011/0064084 A1* | 3/2011 | Tatar et al. | 370/392 |
| 2011/0064093 A1 | 3/2011 | Mattson et al. | |
| 2011/0170561 A1* | 7/2011 | Yaffe | 370/474 |
| 2012/0170585 A1 | 7/2012 | Mehra et al. | |
| 2012/0314707 A1* | 12/2012 | Epps et al. | 370/392 |
| 2014/0036922 A1* | 2/2014 | Yousefi et al. | 370/392 |

OTHER PUBLICATIONS

Written Opinion of the International Searching Authority dated Dec. 20, 2012 in connection with International Patent Application No. PCT/US2012/54506.

International Search Report dated Dec. 11, 2012 in connection with International Patent Application No. PCT/US2012/56947, 2 pages.

Written Opinion of the International Searching Authority dated Dec. 11, 2012 in connection with International Patent Application No. PCT/US2012/56947, 6 pages.

* cited by examiner

METHOD AND APPARATUS TO INCREASE FORWARDING SILICON FUNCTIONALITY THROUGH PACKET MANIPULATION

CROSS-REFERENCE TO RELATED APPLICATION

This application claims priority under 35 USC 119(e) to U.S. provisional Application Ser. No. 61/538,584, filed on Sep. 23, 2011, and which is incorporated herein by reference.

TECHNICAL FIELD

The present invention relates generally to data packet communications, and more particularly, to methods and devices for forwarding data packets using packet manipulation.

BACKGROUND

One class of semiconductor devices gaining prominence in the data packet communications industry is referred to as non-programmable packet forwarding processors (NLFP). These devices, as compared to conventional network processors, are inexpensive with relatively high performance, but lack flexibility and programmability. One reason for this is that the devices are mass-produced with economies of scale. However, these same economies dictate the support functions in mass market systems. The major drawback is that features associated with "long-tail" or niche applications are not supported. Examples of these NLFPs include devices manufactured by Broadcom, such as those marketed and designated under the name Trident™ (BCM56XXX), and Intel, such as those marketed and designated under the name Fulcrum™ (FM2000, FM4000).

For historical and market reasons, these devices are optimized around functionality related to Layer 2 switching. The broad prevalence of Ethernet switching has made it an attractive point of optimization. It is difficult, if not impossible, to implement highly-scaled Layer 3 routing functionality in these devices when such functionality is new and complex, such as in new forms of VPN functionality or IPv6. Advanced and differentiated functionality requires the use of more expensive and power-consuming network processors.

In the rapidly changing networking industry, it would be optimal to leverage the low-cost and high forwarding capacity of these NLFPs to make a cost-effective system design while implementing some of the advanced capabilities and flexibility of network processors. This is particularly true in the data center space. As data centers expand and take on more complexity with virtualization, they require traditional switching silicon to provide more scaled and diverse functions.

Accordingly, there are needed methods and devices that can be utilized with conventional NLFPs to provide these devices with some advance capabilities (as those provided in expensive and programmable network processors).

SUMMARY

In accordance with one embodiment, there is provided a method of routing/forwarding a data packet. The method includes receiving a data packet, pre-processing the received data packet to generate a modified data packet, forwarding the modified data packet to a non-programmable packet forwarding processor (NLFP), processing, by the NLFP, the received modified data packet according to the NLFP functionality to generate a processed data packet, and outputting the processed data packet.

In accordance with another embodiment of the present disclosure, there is provided a routing/forwarding switching device having a packet pre-processor configured to receive a data packet and pre-process the data packet to generate a pre-processed data packet; and a non-programmable packet forwarding processor (NLFP) configured to receive the pre-processed data packet and process the data packet according to the NLFP functionality.

In still another embodiment, there is provided a method for pre-processing a data packet in a network. The method includes receiving a data packet at a pre-processor (PP) device; pre-processing the received data packet to generate a modified data packet; and forwarding the modified data packet to a non-programmable packet forwarding processor (NLFP) for processing.

In yet another embodiment, there is provided a pre-processing (PP) device for use in a data packet communication system. The PP device includes an interface configured for receiving a data packet, a processor coupled to the interface and configured for pre-processing the data packet and generating a modified data packet, memory coupled to the processor and configured for storing information that enables the processor to generate the modified data packet, and the interface is further configured for outputting the modified data packet for input to a non-programmable packet forwarding processor (NLFP).

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
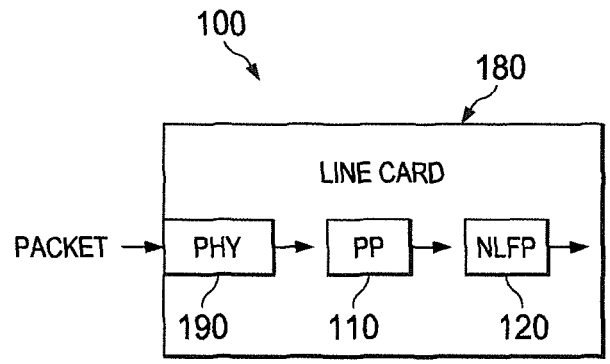
FIG. 1 depicts a relevant portions of a switching system or device 100 in accordance with the present disclosure.

In general terms, the present disclosure describes and teaches methods and devices for pre-processing data packets. In one embodiment, a packet pre-processing (PP) device is coupled to a non-programmable packet forwarding processor (NLFP) to pre-process the data packet prior to processing by the NLFP. The PP device and its functionality described herein may be implemented in various embodiments. For example, the PP device may be constructed or implemented as a field programmable gate array (FPGA), programmable array logic (PAL), an application specific integrated circuit (ASIC), and the like. The PP devices may also be implemented as software within a controller, processor, central processing unit (CPU), and the like. In other embodiments, the PP device may be embodied as a logic block within a media access controller (MAC), or as a logic block or core within an NLFP device itself.

The present disclosure introduces ways to implement new features with (or on) low-cost non-programmable silicon (e.g., NLFP devices) in an efficient manner. This allows communications equipment manufacturers to utilize NLFPs (e.g., an Ethernet controller) in their designs, while also implementing and integrating unique and differentiated functionality. In this way, a manufacturer can benefit from the economics of NLFPs suppliers' production, but avoid the commoditization of the manufacturer's systems. The present disclosure discloses and describes a mapping function that translates one set of features to another set of features, and/or alters portions of features.

As one example, large Internet data centers (e.g., Facebook, Google), as well as Enterprise data centers (e.g., Microsoft), are actively moving or transitioning to the Internet Protocol (IP) version 6 (IPv6). Current data center switching technology (e.g., NLFPs) does not support a scalable IPv6 data path (the current data path limit is about 30K routes). The PP device and methods described in the present disclosure enable systems to substantially increase that limit, and in some cases, perhaps by an order of magnitude (about 250K routes).

Generally, the present disclosure teaches and describes devices and methods for pre-processing (e.g., modifying, manipulating, altering, spoofing, etc.) data packets in order to enable, or cause, NLFPs that process the data packets to provide, in effect, a system-level behavior on the packets that is different from the system-level behavior for which the NLFP is/was conventionally designed. In other words, the data packet is "pre-processed" to change or manipulate the data packet, and then the NLFP processes the pre-processed data packet in accordance with its conventional function(s).

As will be appreciated, the term "pre-process" as used and described herein refers to processing the data packet in some manner so as to modify its contents. This may include appending data to the packet, or in most cases, changing the contents of the data packet. Pre-processing a data packet (as described herein) refers to modifying a data packet to enable a non-programmable packet forwarding processor (NLFP) to further process the data packet in accordance with a system function different from the system function normally provided by the NLFP in the switching system.

As one example, let us assume that a particular NLFP normally functions to provide data packet routing/forwarding based on MAC address(es) (e.g., source and/or designation MAC address). This NLFP cannot be utilized for routing/forwarding of data packets according to an IPv6 address scheme. In the present disclosure, pre-processing of a data packet having IPv6 addresses occurs in such a manner so as to enable the NLFP to route/forward the data packet according to the IPv6 address(es) therein. While this is but one example of pre-processing the data packet, data packets may be pre-processed differently depending on the functionality of the NLFP and the desired system function to be performed on the received data packet. Examples of other desired system functions that may be applied to data packets or processed in accordance with this disclosure may include L2 VPN forwarding, L3 VPN forwarding, network address translation, IPv4 forwarding table expansion, Openflow-based forwarding (based on Open Network Foundation forwarding specifications), deep-packet inspection, and the like, etc.

Now turning to FIG. 1, there are shown in block diagram form relevant portions of a switching system or device 100 in accordance with the present disclosure. The switching device 100 (which may also be referred to herein as a "packet forwarding processor") includes a packet pre-processor (PP) device 110 and a non-programmable packet forwarding processor (NLFP) 120. Though shown implemented within a line card 180 having a physical port/connector 190, the switching device 100 may be implemented or incorporated into any suitable device or system.

As will be appreciated, the NLFP 120 is non-programmable, and those of ordinary skill in the art can readily understand (and differentiate between) those conventional NLFPs which are non-programmable and those which are programmable. In the event such understanding may not be apparent, a programmable packet forwarding processor is a device which includes an instruction store in memory and uses a load and execute architecture/functionality (e.g., loads and executes instructions). In other words, a packet forwarding processor structured or operating as a Von Neumann (Princeton) or Harvard architecture is programmable. The NLFP 120 of the present disclosure does not include this architecture/programmability.

The PP device 110 pre-processes a received data packet prior to the NLFP 120 performing its relevant process(es) or function(s) on the data packet. Thus, as shown in FIG. 1, the PP device 110 is disposed within the data path upstream from the NLFP 120. In another embodiment (not specifically shown), the PP device 110 may be coupled to the NLFP 120 via a "look-aside" interface that is coupled to the data path within the NLFP 120 at a point prior to the point the relevant process(es) or function(s) are performed on the data packet by the NLFP 120.

One example embodiment that may be implemented using the teachings herein is directed to IPv6 data packet routing/forwarding. In this example, scaled IPv6 routing/forwarding can be accomplished using the NLFP 120 which is configured as a Layer 2 Ethernet switching device based on MAC addressing. As will be appreciated, current conventional NLFPs support large MAC forwarding tables (about 250K entries) and also support relatively small IPv6 forwarding tables (e.g., about 30K entries). Data centers that currently use a Layer 3 design and which want to support IPv6 will need support for a much larger IPv6 forwarding table.

Utilization of the PP device 110 and the methods described herein enables continued use of the conventional NLFPs within the overall switching/routing system. This provides support for larger IPv6 forwarding tables without the need for expensive programmable network processors. The present disclosure also introduces a control plane process that maps the desired function or behavior to the function(s) of the NLFP 120.

Figure 2:
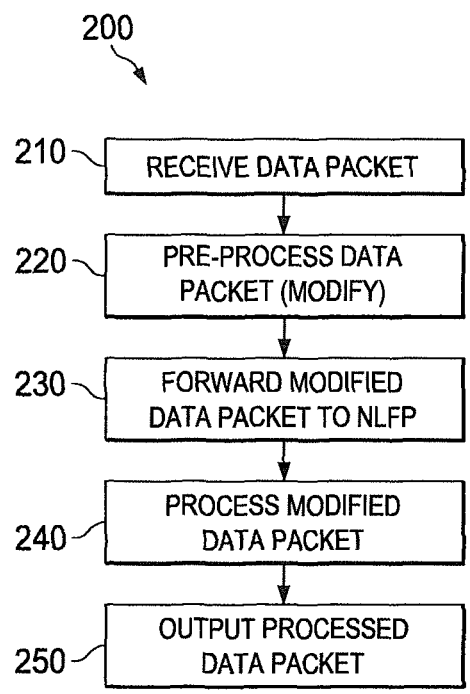
FIG. 2 illustrates a flow diagram of a process for pre-preprocessing a data packet and processing the preprocessed data packet in accordance with one embodiment.

Now turning to FIG. 2, there is illustrated a flow diagram of a process 200 for receiving a data packet at the PP device 110 (step 210), pre-processing the received data packet (step 220) to generate a modified data packet, forwarding the modified data packet to the NLFP 120 (step 230), processing the received modified data packet by the NLFP 120 according to the original/conventional functionality of the NLFP 120 (step 240), and outputting (from the NLFP 120) the processed data packet (step 250).

The PP device 110 modifies the received data packet in a manner or way which enables the NLFP 120 to perform its original/conventional process(es) or function(s) on the modified packet—yet provides a system function on the data packet that is different from the normal system function provided on the data packet without the pre-processing. Without the PP device 110, the received data packet could not be processed, or would not be processed according to the desired system function, by simply inputting the received data packet to the NLFP 120. In other words, data packets that normally cannot be processed by the NLFP 120 (in accordance with a desired system function different from the normal system function of the NLFP) can now be processed and routed/forwarded by the NLFP 120.

Figure 3:
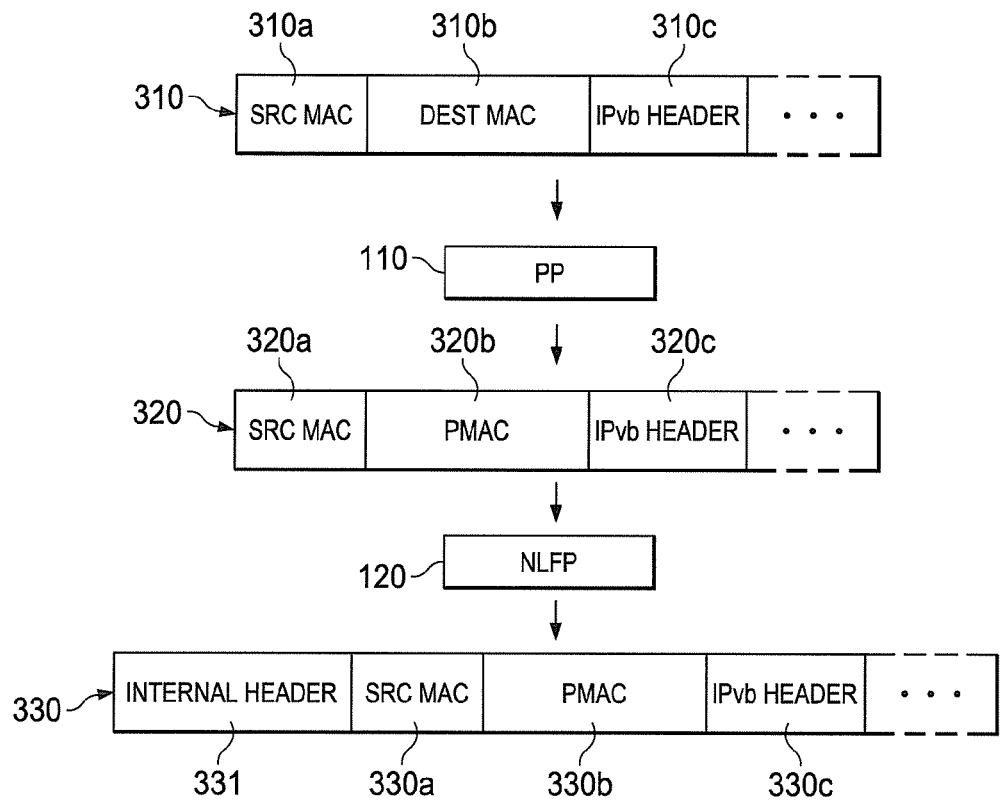
FIG. 3 is an example flow diagram illustrating the format of data packets as received and output by the PP device 110 and the NLFP 120 according to one embodiment.

Now turning to FIG. 3, there is shown an example flow diagram illustrating the format of data packets as received and output by the PP device 110 and the NLFP 120. This example is directed to pre-processing and processing of an IPv6 data packet 310 for forwarding purposes (based on the IPv6 destination address field). As shown, the PP device 110 receives the data packet 310 at its input. The data packet 310 includes a source MAC address 310*a*, a destination MAC address 310*b*, and an IPv6 header 310*c*. Within the IPv6 header are typically included a source IPv6 address and a destination IPv6 address. As will be understood, other fields or data bits are typically included in the data packet 310 but are unnecessary for an understanding of the present disclosure.

Typically, within a switching/routing network, the various routers/switches have access to one or more routing/forwarding tables. These tables may global or local, and generated statically (e.g., manually, at setup, etc.) or dynamically/adaptively during operation of the network (e.g., open shortest path forwarding (OSPF), etc.). The manner in which these particular tables may be generated is well-known in the art, and no further description is provided. In other words, the network generally includes a control plane that maintains and populates these routing/forwarding tables.

As will be appreciated, the device 100, and more particularly the PP device 110, is configured to access an IPv6 routing/forwarding table (not shown in the Figures) populated with numerous entries. It will be further understood that the IPv6 routing/forwarding table may be stored in memory within the PP device 110 or otherwise accessible to the PP device 110.

In one embodiment, a processor or controller (not shown in FIG. 2) within the PP device 110 generates a pseudo-MAC (PMAC) table from information found in the IPv6 routing/forwarding table. In the example shown in FIG. 2 (i.e., forwarding based on IPv6 destination address), the PMAC table includes numerous entries each including a correspondence between an IPv6 destination address and a PMAC. As will be appreciated, the PMACs are pointers or identifiers that correspond to IPv6 addresses in the IPv6 table. In other embodiments, the PMAC table may be statically or dynamically/adaptively generated, and may further be stored and maintained at some location other than within the PP device 110 but accessible to the PP device 110.

The PP device 110 looks up the IPv6 destination address in the PMAC table to find its corresponding PMAC. The PP device 110 pre-processes (modifies) the received packet 310 by overwriting the destination MAC 310*b* of the packet 310 with the PMAC that corresponds to the IPv6 destination address found in the IPv6 header 310*c* and generates a modified packet 320. As shown in FIG. 3, the output of the PP device 110 is the pre-processed or modified packet 320 including a source MAC address 320*a*, a PMAC 320*b*, and an IPv6 header 320*c*. In this embodiment, the source MAC address 320*a* and the IPv6 header 320*c* are the same as the source MAC 310*b* and the IPv6 header 310*c* from the original packet 310.

After pre-processing (modification), the modified packet 320 is forwarded to the NLFP 120 for processing. This processing performs a MAC-based routing/forwarding process and sends the processed packet out the correct egress port toward its destination). In this procedure, the NLFP 120 correlates the received PMAC 320*b* and the source MAC 320*a* with a MAC-based forwarding table. As will be appreciated, the NLFP 120 performs its normal function of routing/forwarding (MAC-based routing) based on the information in the MAC address field(s)—and in this particular embodiment, that field is the conventional destination MAC address field (e.g., 320*b*). Thus, the NLFP 120 inspects the information in the field which it believes is a destination MAC address and routes/forwards the packet based on its MAC routing table (not shown). As will be appreciated, the destination MAC address field does not include a real destination MAC address, but actually includes the PMAC 320*b* in its place.

In normal operation, the NLFP 120 maintains (or has access to) a MAC-based next hop table which identifies the egress port/interface to which the data packet should be sent. The NLFP 120 performs its normal function of receiving a data packet having MAC address fields (and other fields) and generating an internal header for the data packet for delivery of the data packet to the appropriate egress/interface port.

As noted previously, within the switching/routing network, the various routers/switches have access to one or more routing/forwarding tables. With respect to the NLFP 120, it utilizes a MAC-based routing/forwarding table to process the data packets. Similarly, such MAC-based routing/forwarding tables may be stored in memory within the NLFP 120 or otherwise accessible to the NLFP 120.

In one embodiment, the MAC-based routing/forwarding table is generated by the processor or controller (not shown in FIG. 2) within the PP device 110. In another embodiment, it may be generated by another control plane (e.g., the network). The MAC-based routing/forwarding table may be stored within the NLFP 120 or stored at some other location accessible to the NLFP 120.

With reference/access to the original IPv6 routing/forwarding table and the generated PMAC table, the MAC-based routing/forwarding table to be used by the NLFP 120 can be generated. As will be appreciated, and for example, the original IPv6 table will include entries associating the IPv6 destination entries with forwarding entries. With the knowledge of which PMAC is assigned to which IPv6 destination address (in the PMAC table), the MAC-based routing/forwarding table is generated with PMAC entries and their associated routing/forwarding entries.

As a result, the NLFP 120 routes/forwards the data packet unknowingly based on the information within the IPV6 routing/forwarding table, although it inspects the data packet field which normally includes a destination MAC address.

In the embodiment shown in FIG. 3, the NLFP 120 outputs a processed data packet 330 having an internal header 331, a source MAC 330*a*, a PMAC 330*b* and an IPv6 header 330*c*. As will be appreciated, the source MAC 330*a*, the PMAC 330*b* and the IPv6 header 330*c* are the same source MAC 320*a*, the PMAC 320*b* and the IPv6 header 320*c* from the pre-processed packet 320. The internal header 331 includes a MAC address and next hop information (obtained from the MAC-based routing/forwarding table.

The embodiment described above and shown in FIG. 3 is directed to routing/forwarding of IPv6 data packets based on the IPv6 destination address. As will be appreciated, the routing/forwarding may also be based on the source address or on both the source and destination addresses. In addition, although the embodiment described is directed to receiving and routing/forwarding a data packet, the principles and teachings of the present disclosure are similarly or equally applicable in the reverse.

There are two ways to solve the problem of collisions between real MACs and PMACs. One method is to simply reserve a small number of officially registered MACs under a known Organizationally Unique Identifier (OUI) to be used as PMACs. The same set may be used by any PP device 110 because the MACs may be overwritten (in Layer 3 mode). The other method would be for the PP device 110 to look for packets with collisions and overwrite the MACs of such packets with a PMAC that does not correspond to any forwarding entry (a NULL PMAC).

Similar methods can be used to implement tunneling and VPNs techniques such as Virtual Private Local Area Network (LAN) Service (VPLS), List Processing (LISP), Layer 3 (L3) VPNs. Other methods may be implemented using the teachings herein (e.g., utilization of a PP device 110 to modify data packets prior to input to the NLFP 120 to enable a different system function to be applied to the data packet than the system function normally applied by the NLFP 120).

At least the PP device 110 described in the disclosure may be implemented as a network apparatus or component, such as a network node or unit. For instance, the features/methods in the disclosure may be implemented using in a PP device including hardware, firmware, and/or software installed to execute on hardware (as described above).

Figure 4:
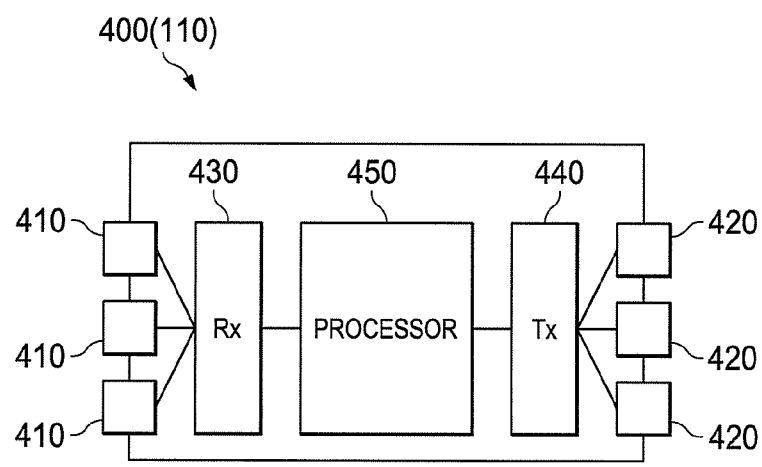
FIG. 4 is a more detailed block diagram of the packet pre-processor shown in FIG. 1.

As illustrated in FIG. 4, the PP device 110 may be implemented in accordance with a device 400 that includes one or more ingress ports 410 and egress ports 420 (interface), a receiver 430 coupled to the ingress ports 410 (for receiving data packets from other devices), a transmitter 440 coupled to the egress ports 420 (for transmitting data packets to other devices, such as the NLFP 120), and a processor 450 (or controller) coupled to the receiver 430 and to the transmitter 440 for preprocessing (modifying) received data packets. The processor 450 may include one or more processors, or multi-core processors. Though not shown, the device 400 includes memory that stores various operating instructions (e.g., firmware, software) which controls the operation of the device 400 as desired, and may be configured to store the PMAC table. Further, the ingress ports 410 and/or the egress ports 420 may be constructed or configured with components to provide electrical and/or optical transmitting and/or receiving functionality.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of routing/forwarding a data packet, the method comprising:
   receiving a data packet;
   pre-processing the received data packet to generate a modified data packet;
   forwarding the modified data packet to a non-programmable packet forwarding processor (NLFP);
   processing, by the NLFP, the received modified data packet according to the NLFP functionality to generate a processed data packet; and
   outputting the processed data packet.

2. The method in accordance with claim 1 wherein the received data packet comprises a source MAC address, a destination MAC address and IPv6 header information comprising an IPv6 source address and an IPv6 destination address.

3. The method in accordance with claim 2 wherein pre-processing the received data packet to generate a modified data packet comprises:
   accessing a routing/forwarding table mapping the IPv6 destination address with an identifier; and
   replacing the destination MAC address with the identifier.

4. The method in accordance with claim 3 wherein processing the received modified data packet comprises:
   determining a forwarding entry by accessing a MAC-based routing/forwarding table mapping the identifier with the forwarding entry.

5. The method in accordance with claim 4 wherein outputting the processed data packet comprises:
   routing/forwarding the data packet in accordance with the forwarding entry.

6. The method in accordance with claim 2 wherein pre-processing the received data packet to generate a modified data packet comprises:
   accessing a routing/forwarding table mapping the IPv6 source address with an identifier; and
   replacing the source MAC address with the identifier.

7. The method in accordance with claim 6 wherein processing the received modified data packet comprises:
   determining a forwarding entry by accessing a MAC-based routing/forwarding table mapping the identifier with the forwarding entry.

8. The method in accordance with claim 7 wherein outputting the processed data packet comprises:
   routing/forwarding the data packet in accordance with the forwarding entry.

9. The method in accordance with claim 1 wherein the received data packet comprises a MAC source/destination address and IPv6 header information comprising an IPv6 source/destination address, and the method further comprises:
   accessing a routing/forwarding table mapping the IPv6 source/destination address with an identifier;

replacing the MAC source/destination address with the identifier;

determining a forwarding entry by accessing a MAC-based routing/forwarding table mapping the identifier with the forwarding entry; and routing/forwarding the data packet in accordance with the forwarding entry.

10. A routing/forwarding switching device comprising:

a packet pre-processor configured to receive a data packet and pre-process the data packet to generate a pre-processed data packet; and a non-programmable packet forwarding processor (NLFP) configured to receive the pre-processed data packet and process the data packet according to the NLFP functionality.

11. The routing/forwarding switching device in accordance with claim 10 wherein the received data packet comprises a source MAC address, a destination MAC address and IPv6 header information comprising an IPv6 source address and an IPv6 destination address.

12. The routing/forwarding switching device in accordance with claim 11 wherein the packet pre-processor is further configured to:

access a routing/forwarding table mapping a one of the IPv6 destination address or IPv6 source address with an identifier; and replace a one of the destination MAC address or the source MAC address with the identifier.

13. The routing/forwarding switching device in accordance with claim 10 wherein a combined operation of the packet pre-processor and the NLFP results in a system functionality being applied to the received data packets different from the NLFP functionality.

14. The routing/forwarding switching device in accordance with claim 10 wherein the packet pre-processor is coupled to a look aside interface of the NLFP.

15. The routing/forwarding switching device in accordance with claim 10 wherein the packet pre-processor is disposed within a data path upstream of the NLFP.

16. The routing/forwarding switching device in accordance with claim 15 wherein the NLFP consults a MAC-based routing/forwarding table to determine a routing entry for the pre-processed data packet.

17. A method for pre-processing a data packet in a network, the method comprising:

receiving a data packet at a pre-processor (PP) device;

pre-processing the received data packet to generate a modified data packet;

forwarding the modified data packet to a non-programmable packet forwarding processor (NLFP) for processing.

18. The method in accordance with claim 17 the received data packet comprises a source MAC address, a destination MAC address and IPv6 header information comprising an IPv6 source address and an IPv6 destination address, and the method further comprises:

accessing a routing/forwarding table mapping a one of the IPv6 destination address or IPv6 source address with an identifier and replacing a one of the destination MAC address or the source MAC address with the identifier.

19. A pre-processing (PP) device for use in a data packet communication system, the PP device comprising:

an interface configured for receiving a data packet;

a processor coupled to the interface and configured for pre-processing the data packet and generating a modified data packet;

memory coupled to the processor and configured for storing information that enables the processor to generate the modified data packet; and wherein the interface is further configured for outputting the modified data packet for input to a non-programmable packet forwarding processor (NLFP).

20. The PP device in accordance with claim 19 wherein the interface is configured for receiving the data packet comprising a source MAC address, a destination MAC address and IPv6 header information comprising an IPv6 source address and an IPv6 destination address, and the processor is further configured for accessing from the memory a routing/forwarding table mapping a one of the IPv6 destination address or IPv6 source address with an identifier and replacing a one of the destination MAC address or the source MAC address with the identifier.

* * * * *